UNITED STATES PATENT OFFICE.

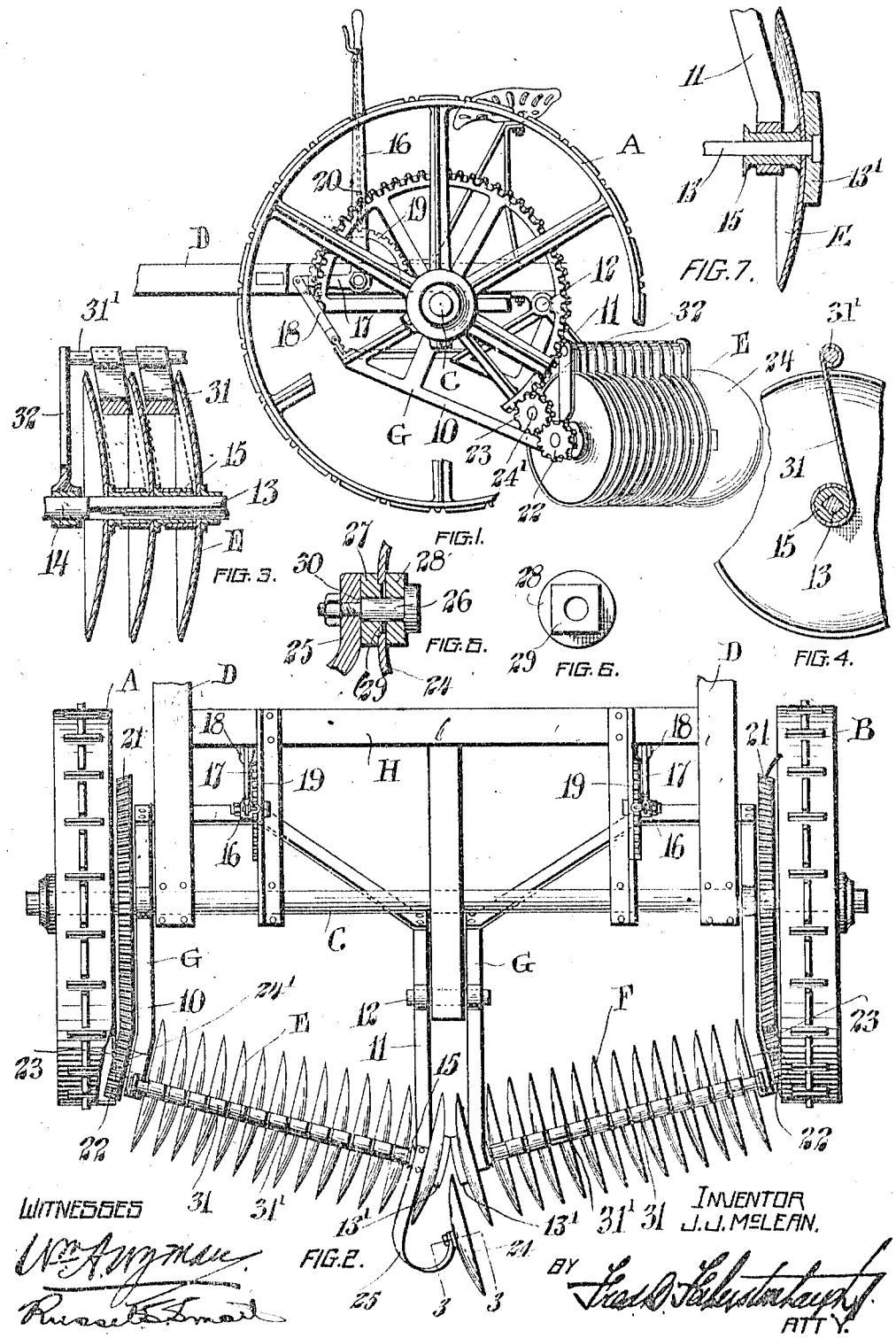

JOHN JAMES McLEAN, OF MOOSE JAW, SASKATCHEWAN, CANADA.

DISK HARROW.

979,782.  Specification of Letters Patent.  Patented Dec. 27, 1910.

Application filed January 21. 1910.  Serial No. 539,394.

*To all whom it may concern:*

Be it known that I, JOHN JAMES MCLEAN, of Moose Jaw, in the Province of Saskatchewan, Dominion of Canada, have invented certain new and useful Improvements in Disk Harrows, of which the following is a specification.

My invention relates to improvements in disk-harrows, and the objects of my invention are to secure greater efficiency in the cutting operation of the harrow, to cause the same to cut the ground more readily and pulverize it more completely: further objects being to provide simple means for regulating the depth of cut and for preventing winding of grass and weeds around the spools between the harrows: further objects still being to provide means for eliminating the furrow ordinarily left between two sets of disks.

The ordinary disk harrow in operation frequently rolls along the ground and does not revolve fast enough to cut a hard surface, such as stubble or sod without several applications. This difficulty is overcome in the present invention by rotating the harrows at a greater speed than that with which they are drawn along, thereby causing them to cut the ground readily and pulverize it more completely. This will also enable the disks to be placed closer together without clogging, and this in turn enables the angle at which the disks are set to be reduced and this reduces draft on the horses.

For complete understanding of the invention, reference must be made to the accompanying specifications and drawings.

In the drawings: Figure 1 is an end elevation of the harrow with the drive wheel partly broken away to more clearly show the working parts. Fig. 2 is a plan view of the harrow. Fig. 3 is an enlarged longitudinal section through several of the disks. Fig. 4 is a transverse section through the shafts supporting the harrow disks. Fig. 5 is a sectional detail taken on the line 3, 3, Fig. 2. Fig. 6 is a plan view of the face of one of the collars shown in Fig. 5. Fig. 7 is a vertical section through the end disks of one of the sets of harrows.

In the drawings like characters of reference indicate corresponding parts in each figure.

Referring to the drawings, A and B represent the driving wheels of any suitable construction, and as shown are supported on the end of a transversely extending axle C, to which one or more tongues D may be attached in the usual way.

E and F represent two sets of harrow blades of usual construction which are convergingly inclined toward each other and meet at substantially the center, the said disks being adjustably supported, this being accomplished in the embodiment illustrated by providing tiltable bracket members G for each set of disks, each set of brackets being formed with side members 10 and 11 which are tiltably supported from the axle C and from a short transversely extending shaft 12 respectively, the shaft 12 being farther rearwardly than the axle C. The shaft 13 supporting the harrow is preferably as usual, made square, and formed with cylindrical end portions 14 which are journaled in the extremities of the side members 10 and 11, the harrows being separated in the usual manner by spools 15, the shaft 13 having disks 13′ on the inner ends which abut and relieve the brackets from lateral strain. The adjustment of the bracket members G is effected by means of a lever 16, tiltably supported from the frame H which connects the tongue D, said lever being formed with a crank 17, connected by a link 18 with the bracket, the lever being held in adjusted position in the usual way, by means of an arcuate segment 19 and a latch 20.

In accordance with the present invention, each of the set of disk harrows are driven in the same direction as the driving wheels, and this is accomplished by connecting the shaft supporting the harrows by suitable gearing with the driving wheel, and it may be here mentioned that the term "gear" as employed herein, is intended to include any form of chain friction or gear drive. In the embodiment illustrated a large driving gear 21 is carried and rotated with the driving wheels A or B, and the end of the shaft 14 has a pinion 22 thereon which is connected to the driving gear 21 by an idler 23 supported from a stub-shaft 24 journaled in the bracket G.

In order to allow for the inclination of the disks, the teeth of the driving gear 21 are preferably beveled slightly as shown, whereby, they may mesh with the teeth of the idler 23.

In order to break the furrow ordinarily formed between the two sets of converging disks, an auxiliary disk 24 Fig. 2, is provided, rotatably supported from a bracket 25 Fig. 2, secured to one of the brackets G, the forward edge of the said disk being adapted to extend a short distance behind the edges of the innermost disks and at substantially their center. The particular means for rotatably supporting this disk 24 Fig. 2, from the bracket 25, Fig. 2, comprises a bolt 26 extending through the bracket and through washers 27 and 28 on opposite sides of the disk, the washer 27 being provided with a square projection 29 which extends into a corresponding perforation provided in the disk 24, the bolt 26 being provided with a shoulder 30 adapted to prevent binding of the bolt against the washers and thereby, permitting free rotation of the disk.

In order to prevent winding of weeds and grass about the spools between the disks, a plurality of straps 31 are provided extending between the disks and substantially filling the space between, the lower end of said straps extending around the spools 15, while the upper end extends around a transversely extending rod 31' which is supported at the opposite end by standards 32 secured to the bracket G.

It will be seen that the construction hereinbefore described, enables the disks to be driven in the same direction to that of the movement of the harrow, thereby, causing it to cut into the ground and effectively perform its function. The disks may be adjusted very quickly by means of the lever 16, and the furrow between the disks is broken by the disk 24. Any winding of grass between the disks is prevented by the straps 31, and the mechanism as a whole will be found well adapted to effectively perform the various functions demanded of it.

As many changes could be made in the above construction, and many apparently widely different embodiments of my invention within the scope of the claims could be made without departing from the spirit or scope thereof, it is intended that all matter contained in the accompanying specifications and drawings shall be interpreted as illustrative and not in a limiting sense.

What I claim as my invention is:

1. A cultivator comprising a transversely extending driving axle, driving wheels on opposite ends of the axle, a tongue connected to the axle, a pair of bracket members pivotally supported from the axle and each including a pair of triangular side members, links connected to the forward ends of the triangular members, a lever operatively connected to each of said links, a set of disk harrows supported from each bracket and means operatively connecting each set of disks with the driving wheels in such a way as to continuously rotate the disks.

2. A cultivator comprising a transversely extending driving axle, driving wheels on opposite ends of the axle, a tongue connected to the axle, a pair of bracket members pivotally supported from the axle and each including a pair of triangular side members, links connected to the forward ends of the triangular members, a lever operatively connected to each of said links, a set of disk harrows supported from each bracket, a driving shaft for each set of disks, a pinion on the driving shaft, a driving gear rotated by each driving wheel, and idlers connecting said driving wheels with the pinion, said idlers being supported from the brackets.

3. In a cultivator and in combination an axle, driving wheels thereon, driving gears connected to the driving wheels, two sets of disk harrows, driving shafts for the sets of disk harrows, pivoted brackets mounted on the axle and each having side members supporting one of the sets of disk harrows, one of said side members journaling the shaft at the end of the set of disk harrows and the other side member entering between the end disk and the second to end disk, a bracket 25 connected to one of the pivoted brackets and extending rearwardly and formed with a hook-shaped end, and an auxiliary disk 24 supported from said hook-shaped end.

In witness whereof I have hereunto set my hand in the presence of two witnesses.

JOHN JAMES McLEAN.

Witnesses:
 ANNIE E. TAYBERY,
 ANNA E. BROWNE.